United States Patent
Nakagawa et al.

(10) Patent No.: US 9,423,589 B2
(45) Date of Patent: Aug. 23, 2016

(54) LENS HOLDER, LENS DRIVING DEVICE, CAMERA DEVICE AND ELECTRONIC DEVICE

(71) Applicant: NEW SHICOH TECHNOLOGY CO., LTD., Yamato (JP)

(72) Inventors: Kenzo Nakagawa, Yamato (JP); Kazuhiko Naito, Yamato (JP)

(73) Assignee: NEW SHICOH TECHNOLOGY CO., LTD., Yamato, Kanagawa-Pref. (JP)

( * ) Notice: Subject to any disclaimer, the term of this patent is extended or adjusted under 35 U.S.C. 154(b) by 9 days.

(21) Appl. No.: 14/465,133

(22) Filed: Aug. 21, 2014

(65) Prior Publication Data

US 2015/0055234 A1    Feb. 26, 2015

(30) Foreign Application Priority Data

Aug. 23, 2013  (JP) .................. 2013-173938

(51) Int. Cl.

| | |
|---|---|
| *G02B 7/02* | (2006.01) |
| *G02B 7/08* | (2006.01) |
| *G02B 7/04* | (2006.01) |
| *G03B 13/32* | (2006.01) |
| *H04N 5/225* | (2006.01) |
| *H02K 41/035* | (2006.01) |
| *G02B 7/10* | (2006.01) |

(52) U.S. Cl.
CPC ............... *G02B 7/08* (2013.01); *G02B 7/022* (2013.01); *G02B 7/026* (2013.01); *G02B 7/04* (2013.01); *G02B 7/102* (2013.01); *G03B 13/32* (2013.01); *H02K 41/0356* (2013.01); *H04N 5/2254* (2013.01)

(58) Field of Classification Search
CPC ...... G02B 7/022; G02B 7/023; G02B 7/026; G02B 7/04; G02B 7/08; G02B 7/09; G02B 7/102; G03B 13/32; G03B 13/34; H04N 5/2254; H02K 41/0356
USPC .................. 359/813, 814, 824; 396/89, 133; 348/357, E5.028, E5.045
See application file for complete search history.

(56) References Cited

U.S. PATENT DOCUMENTS

| | | | | | |
|---|---|---|---|---|---|
| 7,440,201 | B2 * | 10/2008 | Tsuruta | ............... | H04N 5/2254 348/E5.028 |
| 7,630,151 | B2 * | 12/2009 | Fujita | ...................... | G02B 7/08 359/822 |
| 7,639,938 | B2 * | 12/2009 | Hsiao | ...................... | G03B 3/10 359/824 |
| 8,289,638 | B2 * | 10/2012 | Wada | ...................... | G02B 7/08 359/824 |

FOREIGN PATENT DOCUMENTS

JP    2007-121695 A    5/2007

\* cited by examiner

*Primary Examiner* — Loha Ben
(74) *Attorney, Agent, or Firm* — Buchanan Ingersoll & Rooney PC

(57) ABSTRACT

A lens driving device in which the lens holder is employed, a camera device and an electronic device are also disclosed. The lens holder includes portions formed as having the respective different outer circumferential diameters between the upper side and the lower side of the vertical direction and provided in predetermined areas located in the circumferential direction of the outer circumferential wall of the lens holder around which a coil is to be wound, and a flanged portion that protrudes from the outer circumferential wall of the lens holder toward the radially outward side, wherein the diametrically larger portion among the portions formed as having the respective different outer circumferential diameters between the upper side and the lower side of the vertical direction and the flanged portion are arranged so that they can be spaced away from each other by a predetermined gap.

13 Claims, 9 Drawing Sheets

LENS HOLDER, LENS DRIVING DEVICE, CAMERA DEVICE AND ELECTRONIC DEVICE

BACKGROUND OF THE INVENTION

1. Field of the Invention

The present invention relates to a lens holder for use with a lens driving device based on a voice coil motor system, wherein the lens holder has a predetermined length along a vertical direction an optical axis direction and a coil is wound around an outer circumference thereof. The present invention also relates to a lens driving device, a camera device and an electronic device in which the lens holder is mounted.

2. Description of the Relevant Art

In the conventional relevant art field, the lens driving device based on the voice coil motor system has been employed in the autofocus camera or camera-equipped electronic device. This lens driving device allows the lens position to be adjusted so that it can be aligned with the optical axis direction, thereby providing the focusing or zooming function.

In the lens driving device based on the voice coil motor system, it is general that the lens driving device having the structure shown in FIG. 9(a) has been employed. The lens driving device 1 that is illustrated as a typical example in FIG. 9(a) includes a frame 2, a yoke 3, a lens holder 4, a coil 5, a magnet 6, a front side spring 7, a rear side spring 8, and a base 9.

The yoke 3 is supported on the base 9, and the magnet 6 is mounted to the yoke 3. The lens (not shown) is supported by the lens holder 4 having a predetermined length along the vertical direction. On the outer circumference of the lens holder 4, there is the coil 5 which is wound around it such that the coil 5 can face opposite to the before described magnet 6.

The lens holder 4 is held securely between the upper side of the optical axis direction and the lower side of the optical axis direction by the front side spring 7 and the rear side spring 8 so that the lens holder 4 can be aligned with the optical axis direction (the vertical direction). In this way, the lens holder 4 is supported so that it can be moved along the vertical direction (the optical axis direction).

A thrust is produced by controlling the current that is applied across the coil 5. This thrust forces the lens holder 4 and the lens supported thereon to be moved. In this way, the lens (not shown) can be moved up to the position where the thrust is balanced with the respective restoring forces provided by the front side spring 7 and the rear side spring 8. The focusing or zooming function may thus be provided.

FIG. 9(b) and FIG. 9(c) illustrate the conventional methods, respectively, which are generally used to permit the coil 5 to be mounted around the outer circumference of the lens holder 4.

In the first coil winding method shown in FIG. 9(b), the lens holder 4 includes spacer portions 4a, 4b previously formed on the outer circumferential surface, the spacer portions 4a, 4b serving as the protrusions that are used to position the coil 5 in the vertical direction. Using the spacer portions 4a, 4b as reference, the coil 5 will then be wound in the circumferential direction of the lens holder 4.

It should be noted that the spacer portions 4a, 4b are provided so that they can be flush with the height of the coil 5 in the vertical direction. In the first coil winding method, however, there is a problem in that it is difficult to wind the coil neatly because of the coil diameter and the adverse effect of the size tolerance of the lens holder 4 on the winding width adjustment.

On the other hand, the second coil winding method shown in FIG. 9(c) is directed toward solving the problem associated with the first coil winding method, in which a winding width adjusting means 10 is inserted into the inner side of the spacer portion 4a and the coil 5 is then wound by using the winding width adjusting means 10 as reference.

Although the second method can solve the problem associated with the first method, there is another problem in that a gap will arise between the spacer portion 4a and the wound coil 5 after the winding width adjusting means 10 has been removed as shown in FIG. 9(d). The presence of such gap will cause the coil 5 wound on the lens holder 4 to rattle or become unsteady as indicated by an arrow 11.

The lens driving device 1 is a delicate device for which it is not easy to mount the device with the high precision and to ensure that the device will be maintained to be mounted stably. In order to solve this problem, therefore, there is a proposal that is intended for ensuring that the device will be positioned accurately and will be maintained stably in that position (for example, Patent Document 1).

It should be noted, however, that the above proposal is not intended for providing the possibility for making it easier to wind the coil neatly around the lens holder and for preventing the wound coil from rattling or becoming unsteady.

RELEVANT TECHNICAL DOCUMENTS

Patent Document

Patent Document 1: Japanese unexamined Patent Publication No. 2007-121695

SUMMARY

In light of the before described problems, one object of the present invention is to provide a lens holder for use with the lens driving device based on the voice coil motor system in which the lens holder has a predetermined length along the vertical direction and a coil is wound around the outer circumference thereof, and which is designed to enable the coil to be wound neatly and prevent the wound coil from rattling or becoming unsteady. Another object of the present invention is to provide a lens driving device, a camera device and an electronic device in which the before described lens holder is employed.

The disclosure discloses a lens holder for use with a lens driving device based on the voice coil motor system wherein the lens holder has a predetermined length along the vertical direction and a coil is wound around the outer circumference thereof, the lens holder comprising:

a portion formed on predetermined part located in the circumferential direction of the outer circumferential wall of said lens holder on which the coil is wound around, said portion has respectively different outer circumferential diameters along said vertical direction of said portion; and a flanged portion projecting from the outer circumferential wall of said lens holder toward the radially outward side, wherein a diametrically larger portion having larger outer circumferential diameter among said respectively different outer circumferential diameters along said vertical direction of said portion and said flanged portion are spaced away from each other by a predetermined space along said vertical direction.

As one of the advantages of the present invention, the lens holder for use with the lens driving device based on the voice coil motor system is provided, wherein the lens holder is designed to have the predetermined length along the vertical direction and the coil is wound around the outer circumference thereof, and wherein the lens holder provides the possibility for making it easier to wind the coil neatly around the lens holder and for preventing the wound coil from rattling or becoming unsteady. As another advantage, the lens driving device, the camera device and the electronic device in which the before described lens holder is employed are also provided.

BEST MODES OF EMBODYING THE INVENTION

The present invention may be applied to the autofocus camera in which the lens driving device based on the VCM (voice coil motor) system is incorporated as well as the electronic devices such as the mobile phone, the multifunction mobile phone and the like in which such autofocus camera is equipped.

An example of the lens holder and the lens driving device that includes the lens holder will be described below in accordance with the respective current embodiments by referring to FIG. 1 and FIG. 2.

Figure 1:
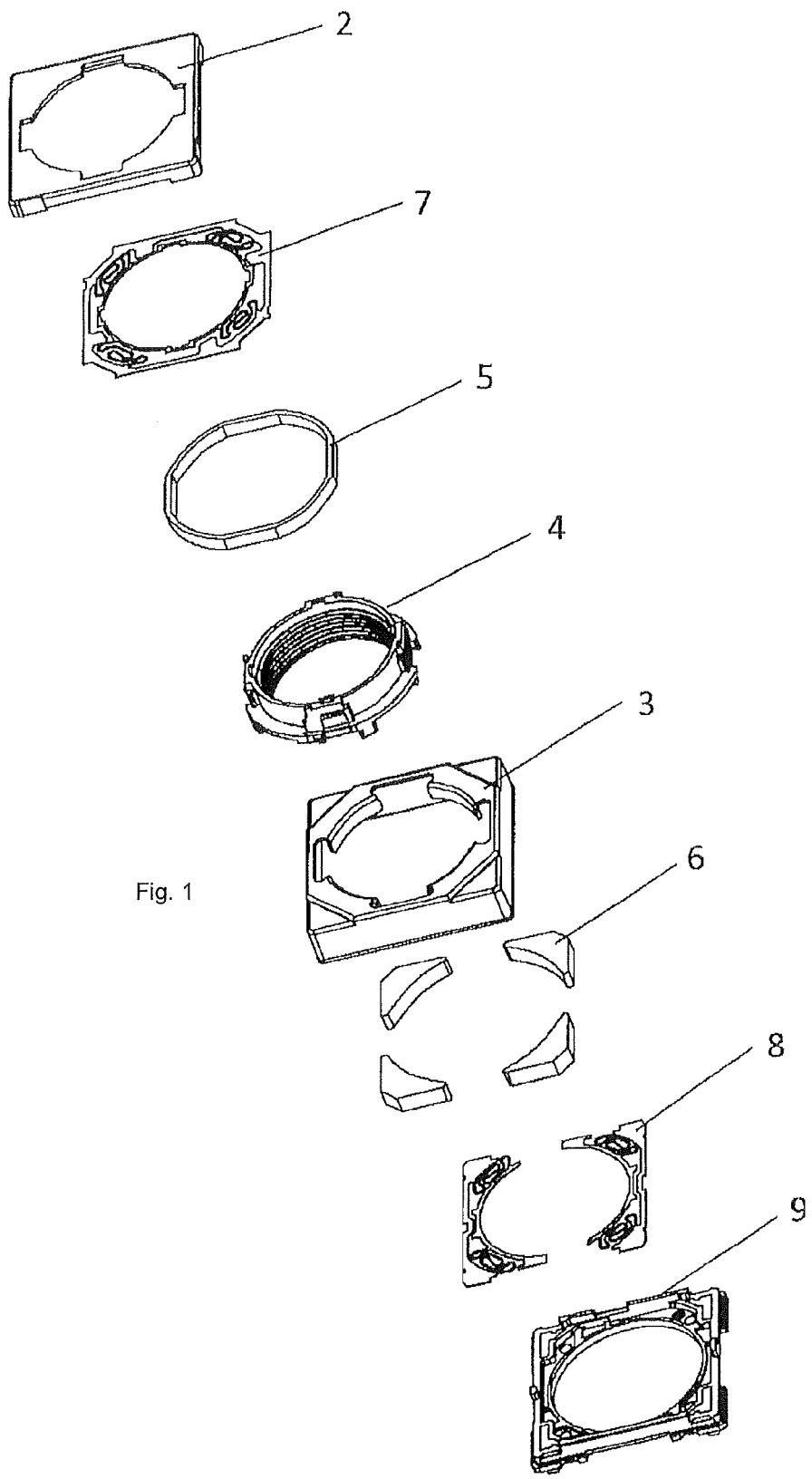
FIG. 1 is an exploded perspective view of one example of the lens driving device in which the lens holder of the present invention is employed in accordance with one embodiment of the present invention.

FIG. 1 is an exploded view in perspective of one example of the lens driving device according to the current embodiment and which includes the lens holder 4 according to the current embodiment. FIG. 2(a) is a plan view of the lens driving device in accordance with one embodiment and FIG. 2(b) is a cross sectional view of the end along the A-A line in FIG. 2(a).

The lens driving device 1 in the current embodiment represents the lens driving device for use with the autofocus camera, which is mounted in the electronic device such as the mobile phone, the multifunction mobile phone and the like.

For the convenience of description, in FIG. 2(b), it is supposed that the upper side of FIG. 2(b) represents the front side in the optical axis direction and the lower side of FIG. 2(b) represents the rear side in the optical axis direction.

Figure 2:
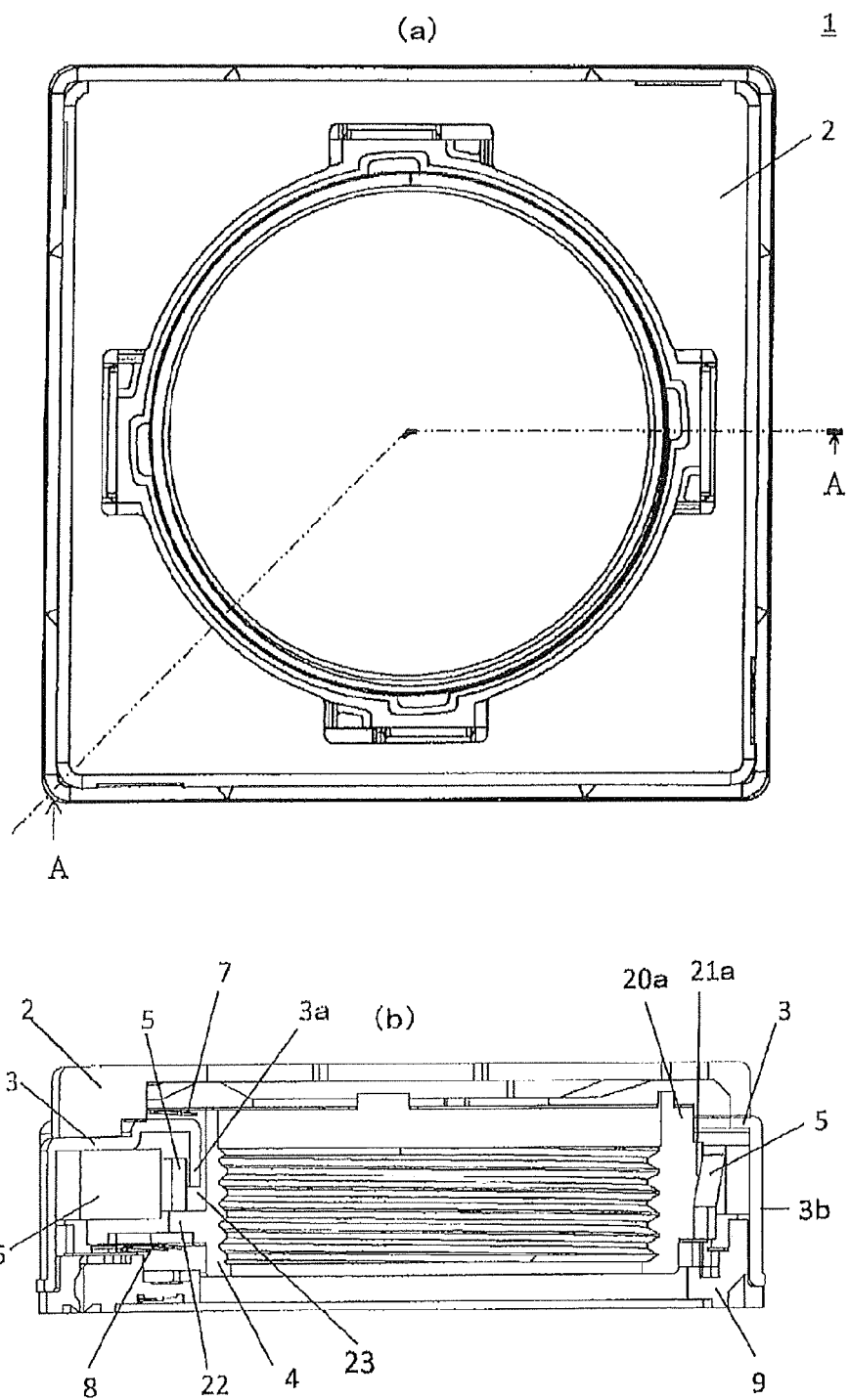
FIG. 2(a) is a plan view of the lens driving device in accordance with one embodiment of the present invention and FIG. 2(b) is a cross sectional view of the end along the A-A line in FIG. 2(a)
Figure 3:
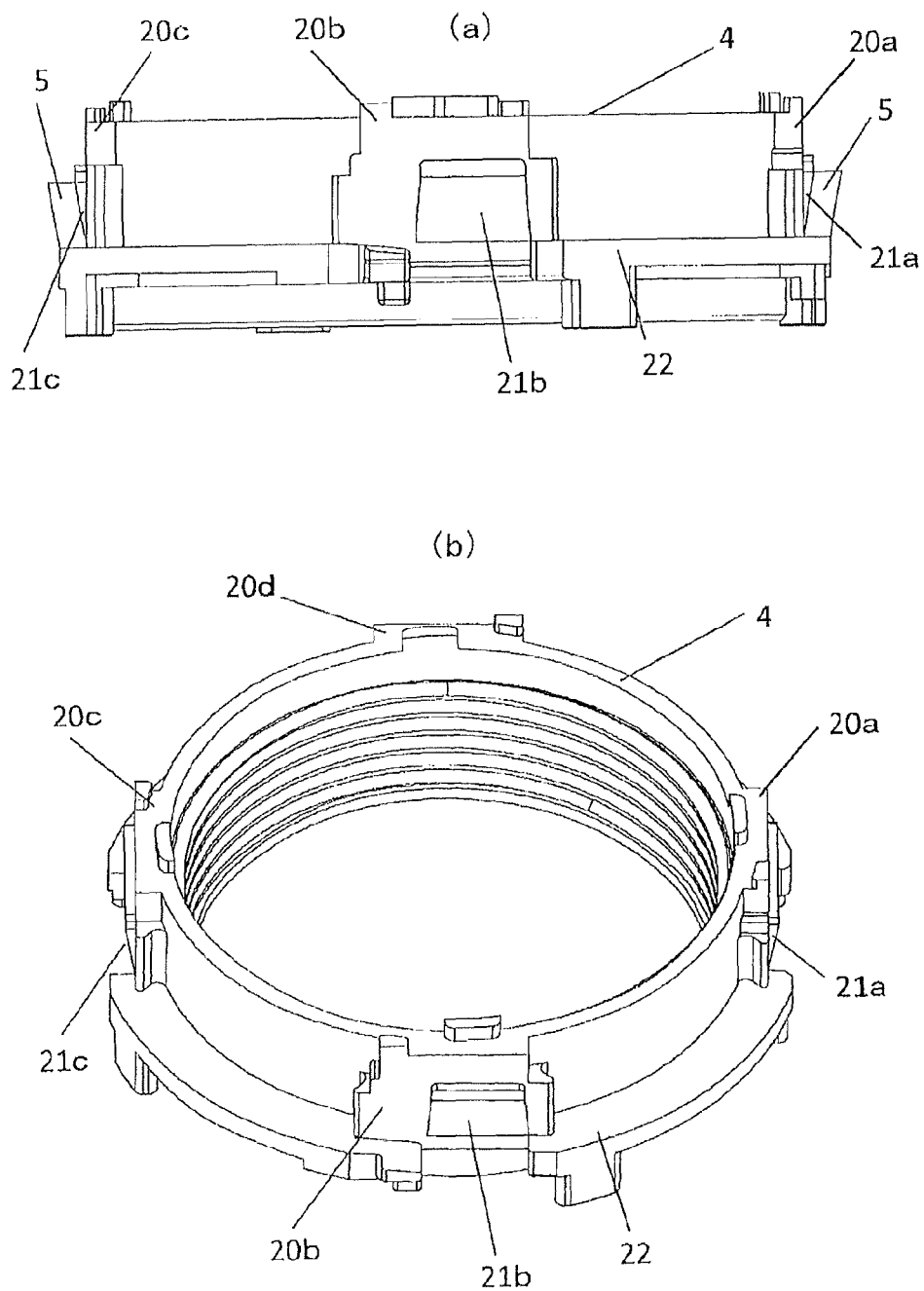
FIG. 3(a) is a side view of the lens holder in accordance with one embodiment of the present invention.
FIG. 3(b) is a perspective view.

The lens driving device 1 presented as one example in FIG. 1 and FIG. 2 includes a frame 2, a yoke 3, a lens holder 4, a coil 5, a magnet 6, a front side spring 7, a rear side spring 8 and a base 9.

In the example shown, the yoke 3 has the annular form and may be rigidly disposed between the base 9 and the frame 2.

The lens holder 4 is held between the front side spring 7 supported by the frame 2 and the rear side spring 8 supported by the base 9. That is, the lens holder 4 is held between the upper and lower sides of the vertical direction (the optical axis direction). This ensures that the lens holder 4 can move in the upward and downward direction (the optical axis direction).

The magnet 6 is arranged inside the outer circumferential wall 3b of the yoke 3. The yoke 3 has annular shape viewed in plane in the embodiment. In the embodiment, the yoke 3 has substantially rectangular or square tubular form as it is viewed in plane. The magnet 6 includes four magnets 6 that are arranged inside the corresponding four corners of the outer circumferential wall 3b of the yoke 3.

The lens holder 4 has a predetermined length along the vertical direction (the optical axis direction), and carries a lens (not shown) on the inner side thereof. The coil 5 is wound around outer circumference of the lens holder 4, so that the coil 5 can face opposite the four magnets 6.

In the embodiment shown, each of the magnets 6 has the arc-like shape on the inner circumferential side which is formed so as to correspond to the substantially tubular shape of the lens holder 4 and follow the outer circumference of the lens holder 4.

Figure 9:
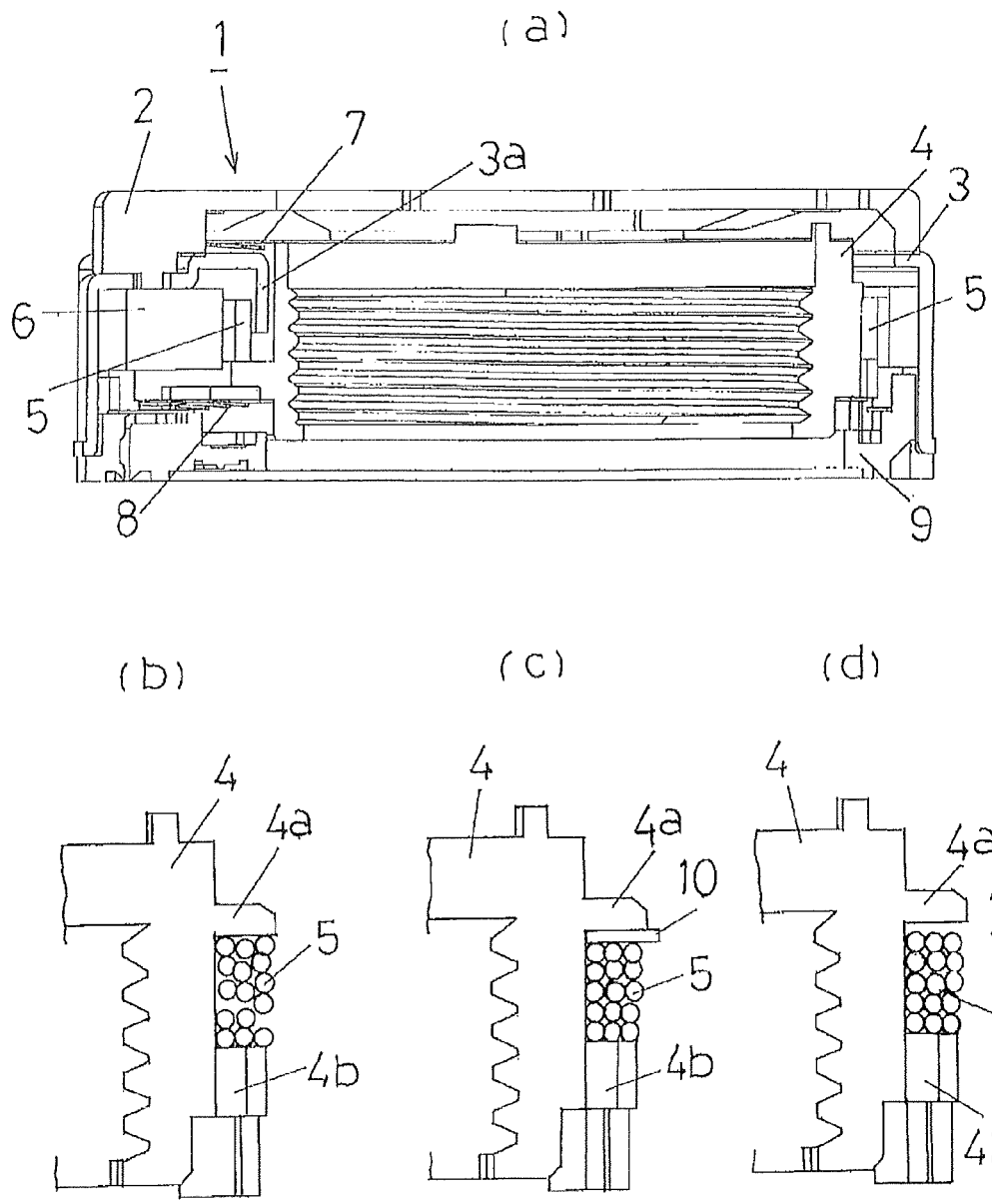
FIG. 9(a) is a cross sectional view used to explain one example of the conventional lens driving device and FIG. 9(b) to FIG. 9(d) are diagrams used to explain the conventional methods of winding the coils around the lens holder.

Like the conventional lens driving device based on VCM system described above in FIG. 9(a), the lens driving device 1 according to the current embodiment may produce a thrust by controlling the electrical current to be applied across the coil 5, causing the lens holder 4 and the lens supported thereby to be moved. This will then permit the lens to be moved up to the position where the thrust can be balanced with the respective restoring forces provided by the front side spring 7 and the rear side spring 8, thereby providing the focusing and/or zooming functions.

The lens holder 4 according to the current embodiment includes a portion formed on predetermined part located in the circumferential direction of the outer circumferential wall of lens holder 4 on which the coil 5 is wound around. The before described portion has respectively different outer circumferential diameters along the vertical direction (the optical axis direction) of said portion. The lens holder 4 further includes a flanged portion 22 projecting from the outer circumferential wall of the lens holder 4 toward the radially outward side. The diametrically larger portion having large outer circumferential diameter among said respectively different outer circumferential diameters along the vertical direction (the optical axis direction) of said portion and the flanged portion 22 are spaced away from each other by a predetermined space along the vertical direction (the optical axis direction).

The structures described below are some examples such that the portion has respectively different outer circumferential diameters along the vertical direction (the optical axis direction) of said portion formed on predetermined part located in the circumferential direction of the outer circumferential wall of lens holder 4 on which the coil 5 is wound around. It should be noted that the present invention is not limited to the following examples.

One example, the before described portion formed on predetermined part located in the circumferential direction of the outer circumferential wall of lens holder 4 on which the coil 5 is wound around has a diametrically larger portion and a diametrically smaller portion between the upper side and lower side of the vertical direction (the optical axis direction) of said portion. The diametrically smaller portion has its outer circumferential diameter smaller than the outer circumferential diameter of the diametrically larger portion.

Another example, the before described portion formed on predetermined part located in the circumferential direction of the outer circumferential wall of lens holder 4 on which the coil 5 is wound around has a diametrically larger portion and a diametrically smaller portion between the upper side and lower side of the vertical direction (the optical axis direction) of said portion. The diametrically larger portion is formed on the upper side or on the lower side of the vertical direction (the optical axis direction) of the lens holder 4. The diametrically smaller portion having its outer circumferential diameter smaller than the outer circumferential diameter of the diametrically larger portion is formed between the upper side and lower side of the vertical direction (the optical axis direction) of the lens holder 4.

The structures shown in FIG. 5 and FIG. 8(a) to FIG. 8(d) represent the respective examples of the before described structures.

Figure 5:
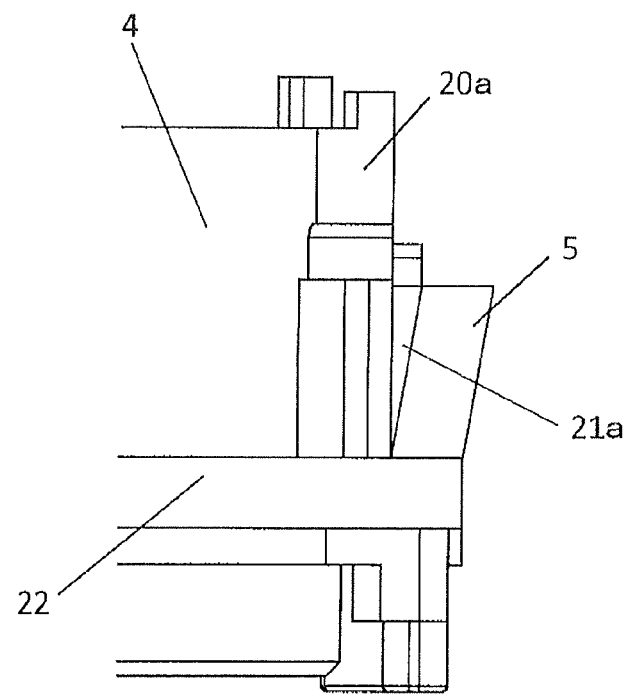
FIG. 5 is an enlarged side view that illustrates the outer circumferential wall of the lens holder in accordance with one embodiment of the present invention although some parts or elements are omitted.

The structure, shown in FIG. 5, includes a tapered portion 21a which is formed above the flanged portion 22, and the outer circumferential diameter of the tapered portion 21a is gradually increasing from the diametrically smaller portion toward the diametrically larger portion. In the structure shown in FIG. 5, the diametrically smaller portion is formed on the lower side of the vertical direction (the optical axis direction), the diametrically larger portion is formed on the upper side of the vertical direction (the optical axis direction), and the tapered portion 21a is formed so that the outer circumferential diameter of the tapered portion 21a is gradually increasing from the diametrically smaller portion toward the diametrically larger portion. The flanged portion 22 protruding from the outer circumferential wall of the lens holder 4 toward the radially outward side is formed so that the flanged portion 22 is spaced away from the diametrically larger portion having large outer circumferential diameter and formed on the upper side of the tapered portion 21a along the vertical direction (the optical axis direction).

In the structure shown in FIG. 8(a), the diametrically larger portions 26a and 26b that are located above the flanged portion 22 are formed on the upper side and on the lower side of the vertical direction (the optical axis direction), respectively, and the diametrically smaller portion 25 that is diametrically smaller than the diametrically larger portions 26a and 26b is formed between the upper side and the lower side. Furthermore, the tapered portion is formed so that the outer circumferential diameter of the tapered portion is gradually increasing from the diametrically smaller portion 25 located in the center toward the diametrically larger portions 26a on the upper side and 26b on the lower side. The flanged portion 22 protruding from the outer circumferential wall of the lens holder 4 toward the radially outward side is formed so that it can be spaced away from the diametrically larger portion 26a on the upper side along the vertical direction (the optical axis direction).

In the structure shown in FIG. 8(b), both of the diametrically larger portion 28 and the diametrically smaller portion 27 are formed and located above the flanged portion 22. The diametrically larger portion 28 is formed on the upper side of the vertical direction (the optical axis direction), the diametrically smaller portion 27 is formed on the lower side, and a stepped portion 29 is formed between those portions. The flanged portion 22 protruding from the outer circumferential wall of the lens holder 4 toward the radially outward side is formed so that it can be spaced away from the diametrically larger portion 28 on the upper side along the vertical direction (the optical axis direction).

In the structure shown in FIG. 8(c), at least one protruded portion (the diametrically larger portion) 30 and at least one grooved portion (the diametrically smaller portion) 31 are formed and located above the flanged portion 22. The at least one protruded portion (the diametrically larger portion) 30 and the at least one grooved portion (the diametrically smaller portion) 31 are formed alternately along the vertical direction (the optical axis direction). Each grooved portion (the diametrically smaller portion) 31 of the at least one grooved portion (the diametrically smaller portion) 31 accepts one coil winding. The flanged portion 22 protruding from the outer circumferential wall of the lens holder 4 toward the radially outward side is formed so that it can be spaced away from the protruded portion (the diametrically larger portion) 30 on the upper side along the vertical direction (the optical axis direction).

In the structure shown in FIG. 8(d), the projections (the diametrically larger portion) 32a and 32b located above the flanged portion 22 are formed on the upper side and on the lower side of the vertical direction (the optical axis direction) of the lens holder 4. The outer circumferential wall of the lens holder 4 between those projections 32a and 32b are formed on the flat surface (the diametrically smaller portion) 33 that is radially smaller than the forward ends of the projections 32a and 32b. The flanged portion 22 protruding from the outer circumferential wall of the lens holder 4 toward the radially outward side is formed so that it can be spaced away from the projection 32a (the diametrically larger portion) on the upper side or the projection 32b (the diametrically larger portion) on the lower side in the vertical direction (the optical axis direction).

In any of the structures presented as the respective examples in FIG. 5 and FIG. 8(a) to FIG. 8(d), the lens holder 4 includes the portion formed on predetermined part located in the circumferential direction of the outer circumferential wall of lens holder 4 on which the coil 5 is wound around, and having respectively different outer circumferential diameters along the vertical direction (the optical axis direction) of said portion. This permits the coil 5 to be wound neatly without relying on the spacer that was used to determine the height of the coil 5 in the vertical direction in the conventional coil winding method that has been described in FIG. 9(b) to FIG. 9(c) for determining the coil winding width during the coil winding.

In any of the structures presented as the respective examples in FIG. 5 and FIG. 8(a) to FIG. 8(d), furthermore, the diametrically larger portion having larger outer circumferential diameter among the respectively different outer circumferential diameters along the vertical direction of the before described portion formed on predetermined part located in the circumferential direction of the outer circumferential wall of lens holder 4 and the flanged portion 22 are spaced away from each other by a predetermined space along the vertical direction (the optical axis direction). Thereby, when the coil 5 is to be wound around the outer circumferential wall of the lens holder 4, the structure, illustrated in FIG. 5, permits the coil 5 to be wound around the outer circumferential wall of the lens holder 4 by engaging the end on one side of the coil 5 being wound in the vertical direction (the optical axis direction) with the flanged portion 22. In any of the structures illustrated in FIG. 5 and FIG. 8(*a*) to FIG. 8(*d*), the lower side of the coil 5 being wound around the outer circumferential wall of the lens holder 4 may be engaged with the upper side surface of the flanged portion 22, and the upper side end may be placed on the diametrically larger portion that is spaced away from the flanged portion 22 along the vertical direction.

The coil 5 that has been wound neatly as described above will thus be prevented from rattling or becoming unsteady along the vertical direction (the optical axis direction).

FIG. 2 to FIG. 6 illustrate one example of the lens driving device of the current embodiment in which the lens holder 4 of the current embodiment having the structure shown in FIG. 5 is incorporated.

In the embodiment shown, the tapered portion includes four tapered portions 21*a*, 21*b*, 21*c*, 21*d* which are formed in the circumferential direction of the outer circumferential wall of lens holder 4. In this specification, those tapered portions 21*a* to 21*d* may be referred to collectively as the tapered portions 21.

The lens holder 4 includes the flanged portion 22 on the outer circumferential wall thereof. In the embodiment shown, the lens holder 4 has the diametrically smaller portion formed on the lower side of the vertical direction (the optical axis direction) and the diametrically larger portion formed on the upper side of the vertical direction (the optical axis direction). The tapered portions 21 are formed so that the outer circumferential diameter of the tapered portions 21 is gradually increasing from the diametrically smaller portion toward the diametrically larger portion. The lower end of the coil 5 being wound around the outer circumferential wall of the lens holder 4 in the vertical direction is placed on the flanged portion 22.

In the embodiment shown, furthermore, the tapered portions 21 are formed on the outer circumferential surfaces of the corresponding protruded portions 20*a*, 20*b*, 20*c*, 20*d* that are provided in the predetermined areas in the circumferential direction of the outer circumferential wall of the lens holder 4 and extend toward the radially outward side. In this specification, those protruded portions 20*a* to 20*d* may be referred to collectively as the protruded portions 20.

Figure 4:
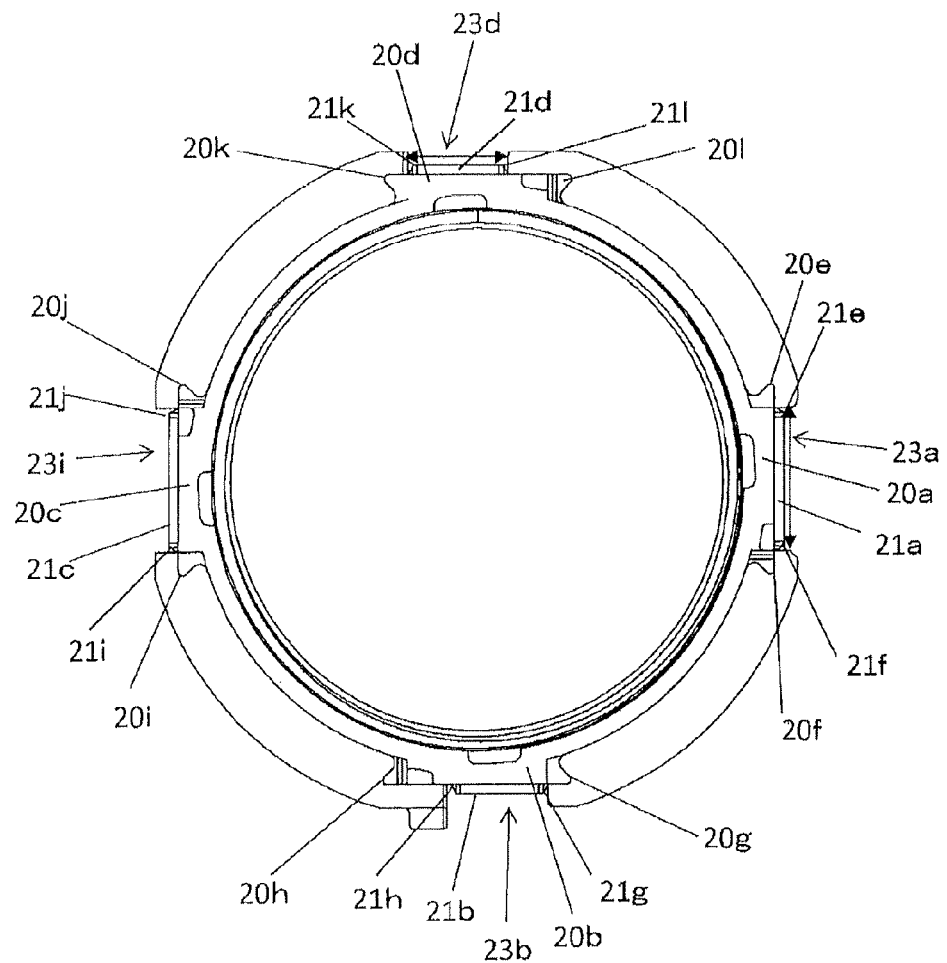
FIG. 4 is a plan view of the lens holder in accordance with one embodiment of the present invention.

The end edges 20*e*, 20*f* of the protruded portion 20*a* in the circumferential direction thereof extend along the vertical direction (the optical axis direction), and they are equally distant from the center of the lens holder 4 in the radial position as shown in FIG. 4. This is the same in the other protruded portions 20*b*, 20*c*, 20*d*. The end edges 20*e*, 20*f*, 20*g*, 20*h*, 20*i*, 20*j*, 20*k*, 20*l* of the protruded portions 20 in the circumferential direction thereof extend along the vertical direction (the optical direction), and they are equally distant from the center of the lens holder 4 in the radial position.

In the embodiment shown, the tapered portions 21 are formed on the outer circumferential surfaces of the corresponding protruded portions 20, and the protruded portions 20 have the respective opposed end edges in the circumferential direction thereof. The coil 5 that has thus been wound around the lens holder 4 will take the state shown in FIG. 6.

Figure 6:
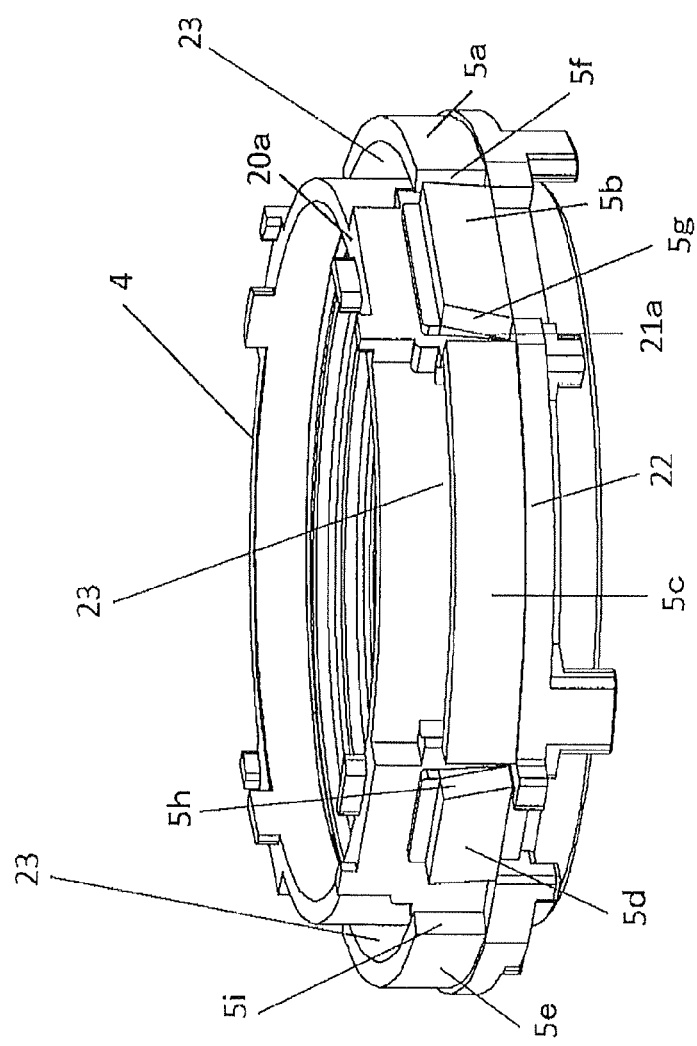
FIG. 6 is a perspective view of the lens holder having the coil wound around it in accordance with one embodiment of the present invention in which the wound coil is broken away on its middle way so that part of the wound coil can be seen in cross section.

FIG. 6 is a view in perspective of the state in which the coil 5 has been wound around the lens holder 4, and illustrates the state in which the coil 5 thus wound is broken away on its middle way and is shown in cross section.

That part 5*a* of the coil 5 which has been wound around the lens holder 4 represents that part of the coil winding which exists between the tapered portion 21*d* formed on the outer circumferential surface of the protruded portion 20*d* and the tapered portion 21*a* formed on the outer circumferential surface of the protruded portion 20*a*. This coil part 5*a* has the cross section 5*f* that is upright as shown in FIG. 6, because the end edge 20*l* of the protruded portion 20*d* and the end edge 20*e* of the protruded portion 20*a* extend along the vertical direction and are equally distant from the center of the lens holder 4 in the radial position.

On the other hand, that part 5*b* of the coil 5 which is wound on the tapered portion 21*a* formed on the outer circumferential surface of the protruded portion 20*a* has the coil cross section 5*g* that is inclined along the inclined surface of the tapered portion 21*a*.

Similarly, that part 5*e* of the coil 5 which is wound around the lens holder 4 and exists between the tapered portion 21*b* formed on the outer circumferential surface of the protruded portion 20*b* and the tapered portion 21*c* formed on the outer circumferential surface of the protruded portion 20*c* has the coil cross section 5*i* that is upright as shown in FIG. 6, because the end edge 20*h* of the protruded portion 20*b* and the end edge 20*i* of the protruded portion 20*c* extend along the vertical direction and are equally distant from the center of the lens holder 4 in the radial position.

On the other hand, that part 5*d* of the coil 5 which is wound on the tapered portion 21*b* formed on the outer circumferential surface of the protruded portion 20*b* has the coil cross section 5*h* that is inclined along the inclined surface of the tapered portion 21*b*.

In the lens holder in the current embodiment that includes the portions formed as having the respective different outer circumferential diameters along the vertical direction (the optical axis direction), that part of the coil 5 which is wound around the lens holder 4 has its cross section that is inclined with respect to the optical axis direction in the predetermined areas in the circumferential direction of the outer circumferential wall of the lens holder 4. As the tapered portions 21 are formed on the outer circumferential surfaces of the corresponding protruded portions 20 and the protruded portions 20 have the respective opposed end edges in the embodiment described above, the coil 5 has the cross section that is aligned with the optical axis direction in the other circumferential areas than those described above.

It may be seen from FIG. 6 that a gap 23 exists between each of the coil part 5*a*, coil part 5*c* and coil part 5*e* and the outer circumferential wall of the lens holder 4. In the embodiment shown in FIG. 2(*b*) in which the yoke 3 has the inner circumferential wall 3*a* inside the radial direction, the inner circumferential wall 3*a* of the yoke 3 may be inserted into the gap 23 in the state in which the lens driving device 1 has completely been assembled.

Thus, even when the inner circumferential wall 3*a* of the yoke 3 has been inserted into the gap 23, the lens holder 4 and the lens carried by the lens holder 4 can be moved with the desired precision when they are to be moved by conducting the electrical current through the coil winding 5.

By considering the size of the region being occupied by the coil winding 5 having the cross section that is aligned with the optical axis direction and is upright, it is preferred that the protruded portions 20 and the tapered portions 21 formed on the outer circumferential surface of the corresponding protruded portions 20 are to be spaced away from each other in the circumferential direction of the outer circumference of the lens holder 4. In the embodiment shown, it is also preferred that the protruded portions 20 should be provided in the corresponding four areas so that they can be spaced away from each other at equal intervals in the circumferential direction of the outer circumference of the lens holder 4.

It is preferred that the respective end edges 21e, 21f, 21g, 21h, 21i, 21j, 21k and 21l of the tapered portions 21 in the circumferential direction thereof and the respective end edges 20e, 20f, 20g, 20h, 20i, 20j, 20k and 20l of the corresponding protruded portions 20 in the circumferential direction thereof should be chamfered into corners as shown in FIG. 4.

This can reduce the bending damage that the coil 5 might suffer if it should make contact with those end edges while the coil 5 is being wound around the lens holder 4.

In the embodiment shown, one tapered portion 21 is formed on the outer circumferential surface of one protruded portion 20. Alternatively, more than one tapered portion 21 may be formed on the outer circumferential surface of one protruded portion 20 so that those tapered portions 21 can be spaced away from each other at equal intervals in the circumferential direction.

Figure 7:
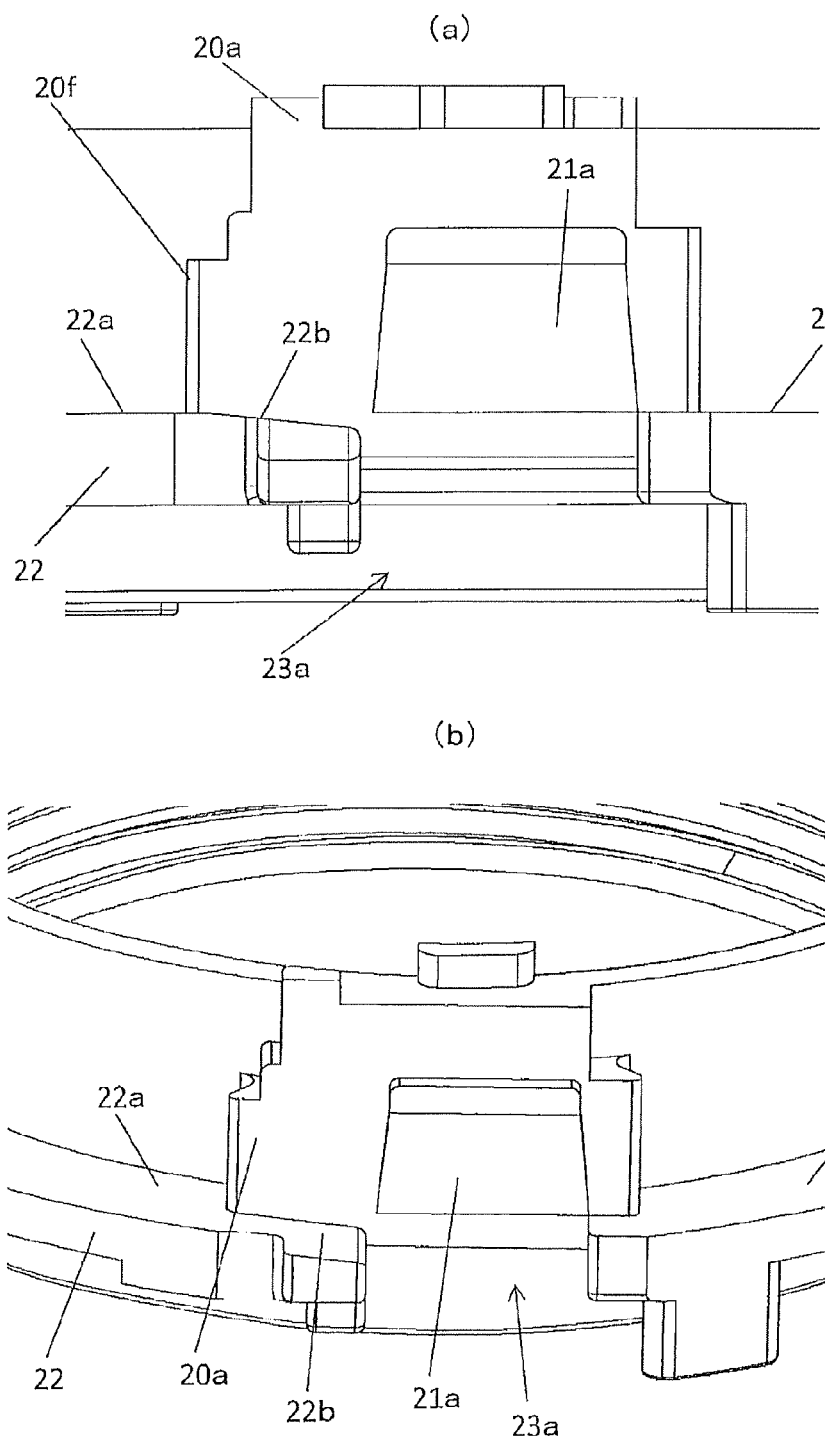
FIG. 7(a) is an enlarged side view of the tapered portion formed on the lens holder in accordance with one embodiment of the present invention although some parts or elements are omitted and FIG. 7(b) is a perspective view of the tapered portion shown in FIG. 7(a)
Figure 8:
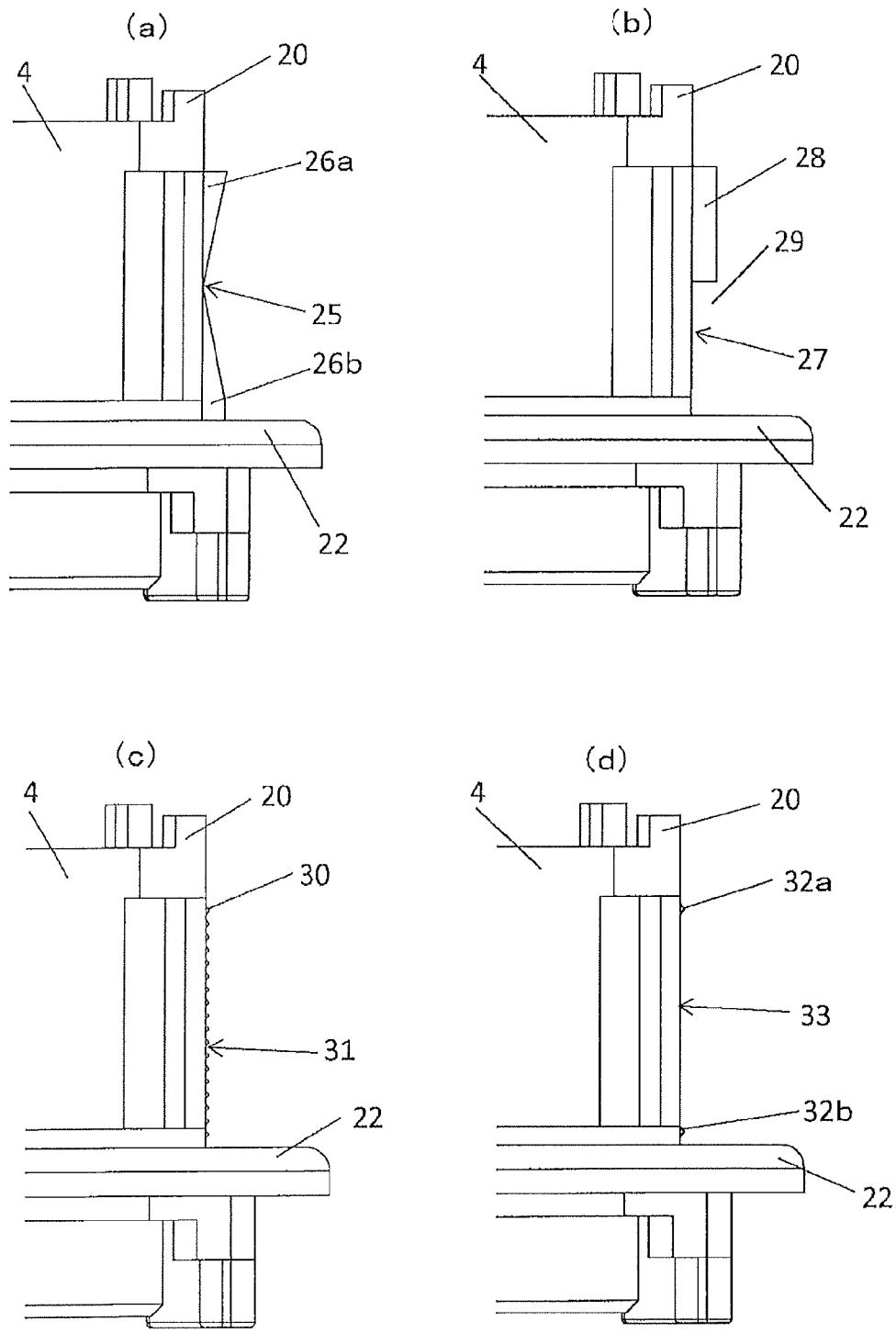
FIG. 8(a) to FIG. 8(d) are enlarged side views of the outer circumferential walls for the lens holder in accordance with another embodiment of the present invention although some parts or elements are omitted.

FIG. 7(a) and FIG. 7(b) are an enlarged side view and a perspective view, respectively, in which the lens holder 4 includes the tapered portions 21 described by using FIG. 2 to FIG. 6 and the locations of the tapered portions 21 are indicated although some parts or elements are omitted.

It may be apparent from FIG. 7(a) and FIG. 7(b) that in the lens holder 4 of the current embodiment, the flanged portion 22 provided on the outer circumferential wall of the lens holder 4 includes a notched portion 23a located in a predetermined area in the circumferential direction of the outer circumferential wall of the lens holder 4.

The flanged portion 22 further includes a flange tapered portion 22b having the upper side surface 22a that is inclined downwardly toward the notched portion 23a.

When a coil 5 is to be wound around the lens holder 4, the flange tapered portion 22b may be used as the tapered portion for beginning to wind the coil 5. This can reduce the bending stress that the coil 5 may suffer at the beginning of the coil winding. After the first turn of the coil winding is completed, the second and subsequent turns can be entered straightly. This provides the easier and more accurate means for winding the coil 5 neatly around the lens holder 4.

From the aspect of the fact that it is preferably to provide the upright coil cross section between two adjoining protruded portions 20 in the circumferential direction of the lens holder 4 in order to utilize the end edge of each of the protruded portions 20 in the circumferential direction, it is preferred that the notched portion 23a should be formed on the area where the tapered portions 21 are provided in the circumferential direction of the lens holder 4. Also, from the other aspect of the fact that it is easy to make lens holder 4 by molding if the lens holder 4 to be molded has notched portion 23a on the area where the tapered portions 21 are provided in the circumferential direction of the lens holder 4, it is preferred that the notched portion 23a should be formed on the area where the tapered portions 21 are provided in the circumferential direction of the lens holder 4.

As it is apparent from the lens holder 4 of the current embodiment that has been described above, the lens holder 4 has the portion formed on predetermined part located in the circumferential direction of the outer circumferential wall of lens holder 4 on which the coil 5 is wound around, and said portion has respectively different outer circumferential diameters along the vertical direction (the optical axis direction) of said portion. Unlike the conventional coil winding methods described in FIG. 9(b) to FIG. 9(c) for determining the width of the coil winding, this permits the coil 5 to be wound neatly without relying on the spacers for determining the height of the coil winding along the vertical direction. The wound coil 5 obtained in that manner can be prevented from rattling or becoming unsteady since the diametrically different portions are formed along the vertical direction (the optical axis direction), and the flanged portion 22 and the diametrically larger portion are spaced away from each other along the vertical direction (the optical axis direction).

According to the lens driving device 1 based on voice coil motor system in which the lens holder 4 of the current embodiment is mounted, it permits the lens holder 4 to be moved more precisely and can prevent the wound coil 5 from rattling or other failures such as unsteadiness during its use.

Furthermore, according to the camera device such as the autofocus camera having the lens driving device of the current embodiment, and the electronic device such as the mobile phone, the multifunction mobile phone or the like having such camera device equipped, are provided in which said camera device and the electronic device permit the lens holder 4 to be moved more precisely and can prevent the wound coil 5 from rattling or other failures such as unsteadiness during its use.

Although the preferred embodiments of the present invention have been described so far by referring to the accompanying drawings, it should be understood that the present invention is not limited to those preferred embodiments and that the present invention may be modified in numerous ways without departing from the spirit and scope of the invention as defined in the appended claims.

For example, it is preferred that the portion formed on predetermined part located in the circumferential direction of the outer circumferential wall of lens holder 4 on which the coil is wound around and having respectively different outer circumferential diameters along the vertical direction (the optical axis direction) of said portion may be provided on the whole circumferential surface in the circumferential direction of the lens holder 4. It is also preferred that the flanged portion 22 may be provided on the upper side of the lens holder 4 and that the coil 5 may be provided on the lower side. Furthermore, it is preferred that the locations of the flanged portions 22 with respect to the circumferential direction of the outer circumferential wall of lens holder 4 may not be aligned with the locations of the before described portion having respectively different outer circumferential diameters along the vertical direction (the optical axis direction).

What is claimed is:

1. A lens holder for use with a lens driving device based on a voice coil motor system wherein the lens holder has a predetermined length along an optical axis thereof and a coil is wound around an outer circumference thereof, the lens holder comprising:

a portion formed on predetermined part located in a circumferential direction of an outer circumferential wall of said lens holder on which the coil is wound around, said portion having respectively different outer circumferential diameters along said optical axis; and a flanged portion projecting from the outer circumferential wall of said lens holder toward the radially outward side, wherein a diametrically larger portion having larger outer circumferential diameter among said respectively different outer circumferential diameters along said optical axis and said flanged portion are spaced away from each other by a predetermined space along said optical axis.

2. The lens holder as defined in claim 1, wherein the portion having the respective different outer circumferential diameters along the optical axis includes a diametrically larger portion and a diametrically smaller portion that is diametrically smaller than said diametrically larger portion formed on the outer circumferential wall of said lens holder along said optical axis.

3. The lens holder as defined in claim 2, further including a tapered portion having a diameter that is gradually increasing from said diametrically smaller portion toward said diametrically larger portion.

4. The lens holder as defined in claim 3, wherein said tapered portion is formed on outer circumferential surfaces of a corresponding protruded portion that is provided in predetermined areas in the circumferential direction of the outer circumferential wall of the lens holder and extends toward the radially outward side, end edges of the protruded portion in the circumferential direction thereof extend along the optical axis in a radial position where they are equally distant from a center of the lens holder.

5. The lens holder as defined in claim 3, wherein said flanged portion includes at least one notched portion located in a predetermined area in the circumferential direction of said outer circumferential wall, wherein said notched portion is formed in the circumferential direction of said lens holder at which said tapered portion is located in the circumferential direction of said lens holder.

6. The lens holder as defined in claim 2, wherein said flanged portion includes at least one notched portion located in a predetermined area in the circumferential direction of said outer circumferential wall, and a flange tapered portion having its upper side surface being inclined downwardly toward said notched portion.

7. The lens holder as defined in claim 1, wherein the portion having the respective different outer circumferential diameters along the optical axis includes the diametrically larger portion located on an upper side or a lower side of said lens holder along said optical axis and a diametrically smaller portion located between the upper side and the lower side of said lens holder and that is diametrically smaller than said diametrically larger portion.

8. The lens holder as defined in claim 7, further including a tapered portion having a diameter that is gradually increasing from said diametrically smaller portion toward said diametrically larger portion.

9. The lens holder as defined in claim 7, wherein said flanged portion includes at least one notched portion located in a predetermined area in the circumferential direction of said outer circumferential wall, and a flange tapered portion having its upper side surface being inclined downwardly toward said notched portion.

10. The lens holder as defined in claim 1, wherein said flanged portion includes at least one notched portion located in a predetermined area in the circumferential direction of said outer circumferential wall, and a flange tapered portion having its upper side surface being inclined downwardly toward said notched portion.

11. A lens driving device based on the voice coil motor system and including the lens holder as defined in claim 1.

12. A camera device that includes the lens driving device as defined in claim 11.

13. An electronic device that includes the lens driving device as defined in claim 11.

* * * * *